May 22, 1923.
H. BROWN
ANIMAL POKE
Filed Oct. 12, 1920
1,455,861
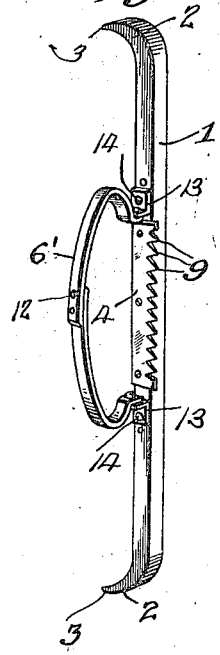
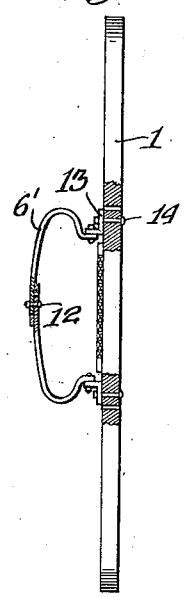
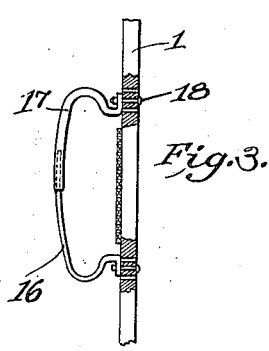
Inventor
Harold Brown
By Mason Fenwick & Lawrence,
Attorneys Patented May 22, 1923.

1,455,861

UNITED STATES PATENT OFFICE.

HAROLD BROWN, OF DACOMA, OKLAHOMA.

ANIMAL POKE.

Application filed October 12, 1920. Serial No. 416,401.

*To all whom it may concern:*

Be it known that I, HAROLD BROWN, citizen of the United States, residing at Dacoma, in the county of Woods and State of Oklahoma, have invented certain new and useful Improvements in Animal Pokes; and I do hereby declare the following to be a full, clear, and exact description of the invention, such as will enable others skilled in the art to which it appertains to make and use the same.

This invention relates to new and useful improvements in animal pokes, and more particularly to a device which can be quickly and readily attached to the neck of the animal or removed therefrom. The main object of this invention is the provision of an animal poke which can be quickly and readily applied to the animal and which will readily operate to restrain the animal when it attempts to force its way through a fence or other obstruction.

Another object of the present invention is the provision of an animal poke whereby the securing means is so arranged that the same may be readily adjusted to accommodate various sizes of animals and wherein the poke can be quickly and readily attached to the animal or removed therefrom.

With the above and other objects in view, the invention consists in the novel features of construction, the combination and arrangement of parts hereinafter more fully set forth, pointed out in the claims and shown in the accompanying drawings, in which—

Figure 1 is a perspective view of an animal poke, constructed in accordance with my invention, Figure 2 is a side elevation, partly in section of the animal poke, and Figure 3 is a fragmentary view of a modified form of my invention.

In carrying out my invention, I provide a main poke bar 1, which may be of any suitable size and preferably provided at each end with substantially angularly disposed portions 2 tapering outwardly into a point 3, thus forming a substantial hook member at each end of the poke bar for engagement with the strands of a fence or other obstruction when the animal attempts to pass therethrough.

Secured to one side of the main poke bar 1 is a plate 4, which extends beynd the surface of the rear face of the poke bar 1 and is notched to provide a plurality of teeth 9 which will engage the animal should it attempt to pass through a fence where any of the parts thereof will engage the poke bar 1, forcing the poke bar inwardly toward the neck of the animal so that the teeth 9 will engage the flesh of the animal and restrain it from attempting a further passage through the fence or other obstruction. It will be readily apparent that when the animal attempts to pass through or force its way through a fence or other enclosure, the hook members 3 of the main poke bar 1 will engage portions of the enclosure and tend to force the poke bar inwardly toward the neck of the animal so that the prongs 9 will engage with the flesh of the animal and tend to restrain it from further passage through the enclosure.

As shown in the drawings the yoke 6' is formed in separate pieces, the intermediate portion of the yoke being detachably connected by means of the bolt 12. In this form of the invention, the inner ends of the yoke are loosely connected with the angular brackets 13 which are attached to the main poke bar 1 by means of the bolts 14. It will be noted that several openings can be formed in the poke bar so that the bolts 14 can be arranged in any one of the openings to adjust the angular members 13 to accommodate the yoke 6' in its various adjusted positions. It will be noted that the meeting ends of the yoke 6' which are connected by means of the bolt 12 are provided with a plurality of openings whereby the size of the yoke can be readily adjusted and retained in adjusted position by means of this bolt 12. The ends of the yoke 6' are loosely connected with the angular members 13 so that the yoke can be quickly removed from the poke bar 1, if desired.

In Figure 3, I have illustrated another form of the invention wherein the yoke is formed of two separable members 16 and 17, the member 17 being adjustably connected to the main poke bar 1 by having the poke bar provided with a plurality of openings adapted to receive the bolt 18. The part 17 of the yoke 6 is substantially tubular in form and the outer end thereof is adapted to receive the outer end of the part 16 so that the ends of the parts 16 and 17 may be readily adjusted with respect to each other to increase or decrease the size of the yoke. It will be readily noted that in this form of the invention, the device can be quickly and readily attached to the neck of the animal or removed therefrom.

From the above description, taken in connection with the accompanying drawings, it will be readily apparent that I have provided a simple and durable animal poke whereby various forms of modifications can be readily carried out without departing from the scope of the invention and it will be noted that after the poke member has been attached to the neck of the animal, the animal will be restrained from attempting to pass through an enclosure as the hook portions 3 of the poke bar 1 will engage with parts of the enclosure and force the prongs 9 into engagement with the flesh of the animal which will cause the animal to abandon its attempt to pass through the enclosure.

What I claim is:

1. An animal poke including a poke bar, a sectional yoke having its inner ends adjustably and detachably connected to the poke bar and arranged in spaced relation and the outer ends overlapped and adjustably and detachably connected.

2. An animal poke including a poke bar, a yoke member formed of two separable sections, each section having its inner end adjustably and detachably connected to the poke bar whereby to permit swinging movement of the yoke, the outer ends of said sections being overlapped and provided with a plurality of aligned openings, a bolt member insertible within said openings to adjustably connect the yoke sections and a plate member secured to the poke bar between the inner ends of the yoke having a serrated edge projecting beyond the edge of the poke bar as and for the purpose set forth.

3. An animal poke including a poke bar, a sectional yoke having its inner ends adjustably connected to the poke bar and arranged in spaced relation and the outer ends of said yoke being overlapping and adjustably and detachably connected.

In testimony whereof I affix my signature.

HAROLD BROWN.